UNITED STATES PATENT OFFICE.

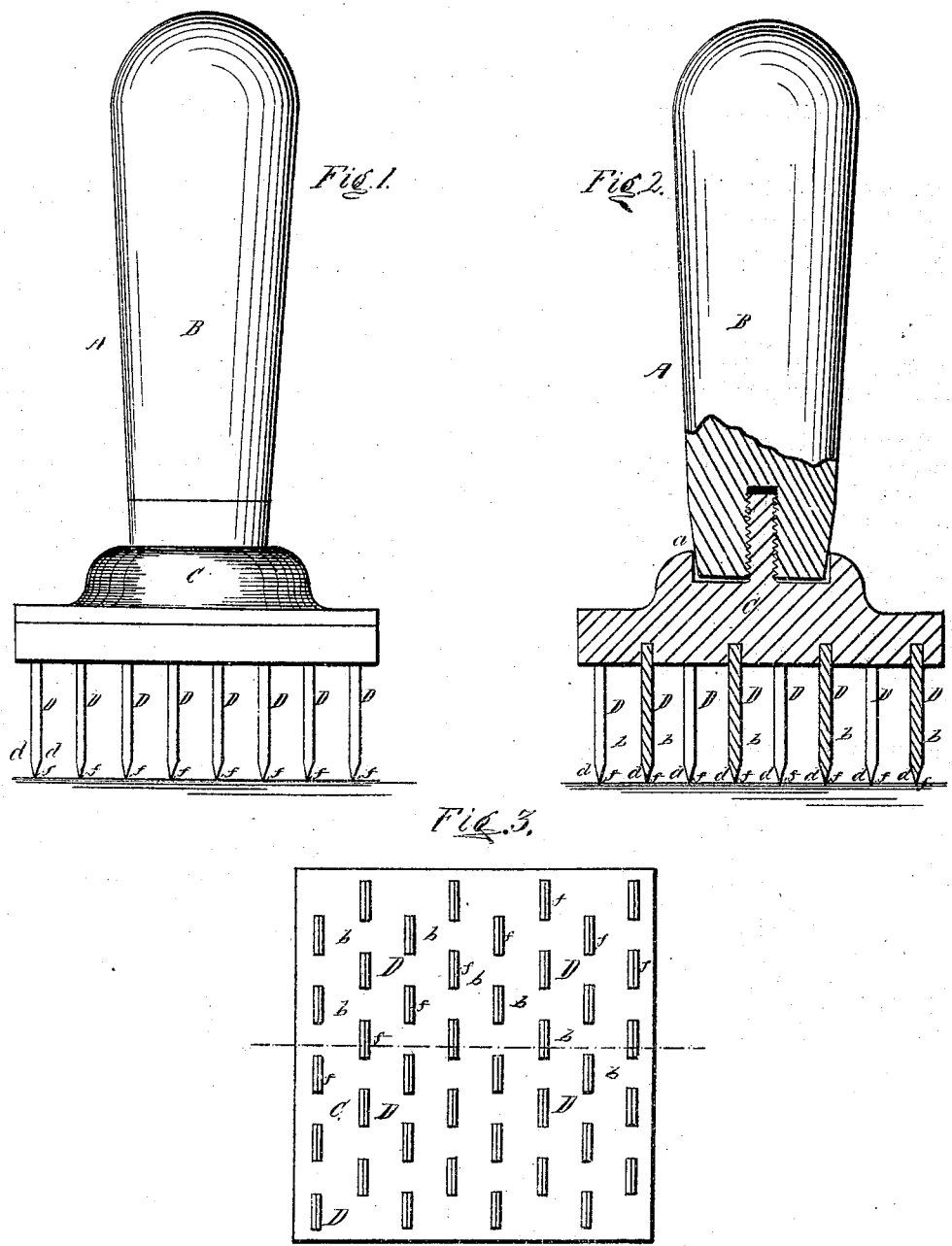

MOSES M. PETTES, OF WORCESTER, MASSACHUSETTS.

IMPROVEMENT IN MEAT-TENDERERS.

Specification forming part of Letters Patent No. 124,383, dated March 5, 1872.

*To all to whom these presents shall come:*

Be it known that I, MOSES M. PETTES, of Worcester, in the county of Worcester and State of Massachusetts, have invented a certain new and useful Improved Implement for Rendering Meat (more particularly steaks) Tender; and that the following is a full, clear, and exact description of the same, reference being had to the accompanying plate of drawing.

The implement embraced by this invention is constructed of a head or holder having a series of projecting blades that are fastened upright in one face of said head, and at their outer ends, across their width, are each made with a cutting-edge.

In the accompanying plate of drawing my improved implement for tendering meats is illustrated, Figure 1 being a side view of the same; Fig. 2, a central cross-section; and Fig. 3, a plan view of the cutting-edge face to implement.

A in the drawing represents my improved implement, of which B is the handle, fixed to a stock or head, C, and D a series of blades to said head C. The handle B is made of wood; but it may be made of metal or other material, and attached to the head C. In the present instance it is shown as screwed into a socket, $a$, cast in the head C, which is made of cast-iron. The head C, as before stated, is made of cast-iron; but it may be made of any other metal. To such head, in the face opposite to that which receives the handle B, the series of blades D are secured. These blades are arranged, in the present instance, in parallel rows across the width of the head, with a space, $b$, between the several blades of each row, the blades of the one row being so disposed as to be opposite the spaces between the blades of the next row, in lieu of opposite the blades. The blades are upright in said head, and project therefrom an even distance, being, at their outer ends $d$ and across their width, beveled on each face, so as to give to them a sharp cutting-edge, $f$. The blades should be made of steel, properly tempered, to prevent their cutting-edges becoming quickly dulled; and to secure them to the head, the head is molded or cast directly about them, they being, for such purpose, suitably disposed, all sharpened, within the mold in which the head is to be cast.

Having thus described my improved implement for rendering meat, steak, &c., tender, I will state my claim, as follows:

The implement A, combining the handle B, head or stock C, and the series of cutting-blades D, arranged in said stock C, all constructed as shown and described, and for the purpose specified.

The above specification of my improved device for rendering steak tender signed by me this 13th day of December, 1871.

M. M. PETTES.

Witnesses:
 ALBERT W. BROWN,
 EDWIN W. BROWN.